(12) United States Patent
Tamagawa (10) Patent No.: US 12,401,767 B2
(45) Date of Patent: Aug. 26, 2025

(54) DISPLAY SYSTEM

(71) Applicant: TOYOTA JIDOSHA KABUSHIKI KAISHA, Toyota (JP)

(72) Inventor: Shuichi Tamagawa, Kitanagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 49 days.

(21) Appl. No.: 18/524,680

(22) Filed: Nov. 30, 2023

(65) Prior Publication Data

US 2024/0251060 A1   Jul. 25, 2024

(30) Foreign Application Priority Data

Jan. 25, 2023   (JP) .................... 2023-009489

(51) Int. Cl.
| | |
|---|---|
| H04N 7/18 | (2006.01) |
| G05D 1/00 | (2024.01) |
| G06V 20/54 | (2022.01) |
| G08G 1/04 | (2006.01) |
| H04N 23/90 | (2023.01) |

(52) U.S. Cl.
CPC .......... *H04N 7/181* (2013.01); *G05D 1/0038* (2013.01); *G06V 20/54* (2022.01); *G08G 1/04* (2013.01); *H04N 23/90* (2023.01)

(58) Field of Classification Search
CPC .......... H04N 7/181; H04N 23/90; H04N 7/18; G05D 1/0038; G06V 20/54; G08G 1/04
See application file for complete search history.

(56) References Cited

U.S. PATENT DOCUMENTS

| | | | | |
|---|---|---|---|---|
| 8,179,241 | B2 * | 5/2012 | Sakai | G08G 1/164 340/436 |
| 9,487,139 | B1 * | 11/2016 | Ishida | B60W 30/08 |
| 10,552,690 | B2 * | 2/2020 | Schubert | G06T 11/00 |
| 11,215,982 | B2 | 1/2022 | Urano et al. | |
| 11,325,618 | B2 | 5/2022 | Umeda | |
| 2007/0139523 | A1 * | 6/2007 | Nishida | G06V 20/58 348/E7.086 |
| 2009/0140881 | A1 * | 6/2009 | Sakai | G08G 1/164 340/901 |

(Continued)

FOREIGN PATENT DOCUMENTS

| | | |
|---|---|---|
| JP | 2021-189683 A | 12/2021 |
| JP | 7029910 B2 | 3/2022 |

*Primary Examiner* — Gelek W Topgyal
(74) *Attorney, Agent, or Firm* — Sughrue Mion, PLLC (57) ABSTRACT

A display system includes: one or more moving body cameras that capture one or more images in front of a moving body; one or more intersection cameras; a display device including one or more screens that display, as one or more images for remote operation of the moving body, one or more moving-body camera images; and one or more processors. The one or more processors are configured to: execute a determination process of determining whether or not a moving object is included in an intersection camera image by analyzing the intersection camera image; and execute a highlighting process of applying a highlighting to the one or more moving-body camera images when the moving object is included in the intersection camera image. The highlighting indicates whether the moving object is present in a left or right direction with respect to a traveling direction of the moving body.

3 Claims, 6 Drawing Sheets

(56) References Cited

U.S. PATENT DOCUMENTS

| | | |
|---|---|---|
| 2018/0181118 A1 | 6/2018 | Yoneda et al. |
| 2019/0137999 A1* | 5/2019 | Taguchi et al. |
| 2020/0063397 A1* | 2/2020 | Hatake ................. E02F 9/2004 |
| 2020/0209888 A1 | 7/2020 | Sakai et al. |
| 2020/0326702 A1 | 10/2020 | Iwamoto et al. |
| 2021/0041894 A1 | 2/2021 | Urano et al. |
| 2021/0055741 A1 | 2/2021 | Kawanai et al. |
| 2021/0058173 A1 | 2/2021 | Otaki et al. |
| 2021/0072743 A1 | 3/2021 | Otaki et al. |
| 2021/0080943 A1 | 3/2021 | Iwamoto et al. |

* cited by examiner

DISPLAY SYSTEM

CROSS-REFERENCES TO RELATED APPLICATION

The present disclosure claims priority under 35 U.S.C. § 119 to Japanese Patent Application No. 2023-009489, filed on Jan. 25, 2023, which is incorporated herein by reference in its entirety.

TECHNICAL FIELD

The present disclosure relates to a display system that displays an image for remote operation of a moving body.

BACKGROUND

JP 2021-189683 A discloses a remote assistance control device that remotely assists traveling of an automated driving vehicle. The control device receives, from the automated driving vehicle, vehicle information including at least position information indicating a traveling position and a surrounding image of the traveling position. Also, the control device reads accident pattern data related to the vehicle information from an accident pattern database in which a plurality of past accident cases and traffic conditions are associated with each other and stored, and superimposes attention calling information on the surrounding image to generate auxiliary information for the driving assistance. The generated auxiliary information for the driving assistance is provided to the automated driving vehicle.

Moreover, JP 7029910 B2 discloses a remote operation system for an operator to remotely operate a vehicle. This system includes a display device that displays the vehicle and an obstacle around the vehicle. The display device displays the obstacle sensed by the vehicle by enclosing the obstacle in a solid-line square frame.

SUMMARY

In order to supplement safety confirmation at an intersection by a remote operator who performs remote operation (remote driving, remote assistance, or remote monitoring) of a moving body, such as an automobile, it is conceivable to display, on a screen of a display device of a remote operator terminal, an image of an intersection camera installed at the intersection. However, the installation direction and the angle of view of the intersection camera vary depending on the intersection. Therefore, even if the image of the intersection camera is displayed on the display device, it is difficult for the remote operator to instantaneously grasp the traveling direction of the moving body in the image, and it may take time to confirm safety.

The present disclosure has been made in view of the problem described above, and an object thereof is to provide a display system that can facilitate safety confirmation by a remote operator at an intersection while using image information of an intersection camera.

A display system according to the present disclosure includes one or more moving body cameras, one or more intersection cameras, a display device, and one or more processors. The one or more moving body cameras are configured to capture one or more images in front of a moving body. The one or more intersection cameras are installed at an intersection through which the moving body passes, and are configured to image a traffic situation in an area of the intersection. The display device includes one or more screens configured to display, as one or more images for remote operation of the moving body, one or more moving-body camera images of the one or more moving body cameras. The one or more processors are configured to: execute a determination process of determining whether or not a moving object is included in an intersection camera image of the one or more intersection cameras by analyzing the intersection camera image; and execute a highlighting process of applying a highlighting to the one or more moving-body camera images when the moving object is included in the intersection camera image. The highlighting indicates whether the moving object is present in a left or right direction with respect to a traveling direction of the moving body.

According to the present disclosure, safety confirmation by the remote operator at an intersection can be facilitated while using the image information of an intersection camera.

DETAILED DESCRIPTION

1. Configuration of Remote Operation System

Figure 1:
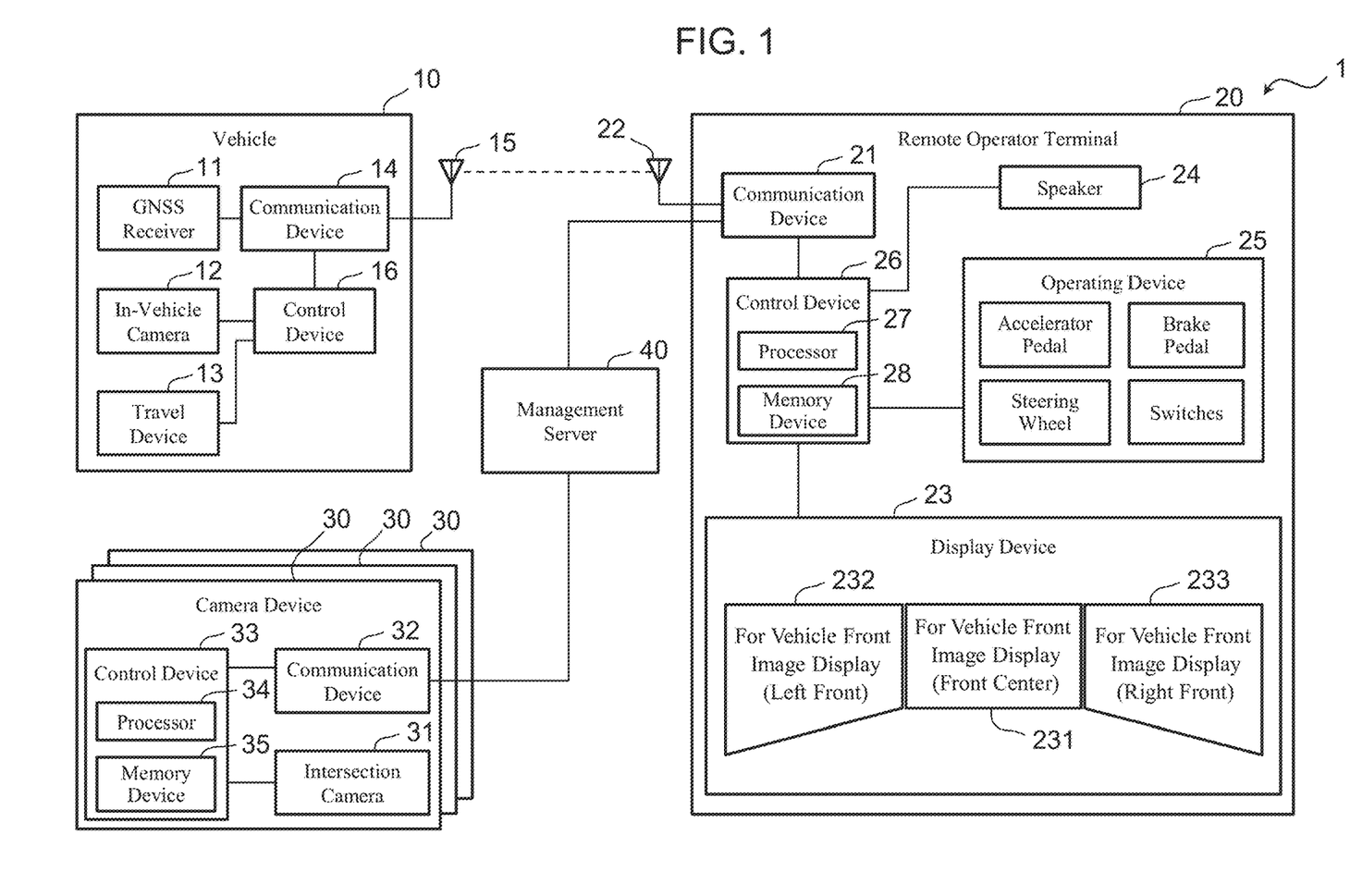
FIG. 1 is a diagram schematically illustrating a configuration example of a remote operation system to which a display system according to an embodiment is applied.

FIG. 1 is a diagram schematically illustrating a configuration example of a remote operation system 1 to which a display system according to an embodiment is applied. The remote operation system 1 includes a vehicle 10, a remote operator terminal 20, a camera device 30, and a management server 40.

1-1. Vehicle

The vehicle 10 is an example of a "moving body" that is a target of "remote operation" according to the present disclosure, and more specifically, is, for example, an automobile. The vehicle 10 includes a global navigation satellite system (GNSS) receiver 11, one or more in-vehicle cameras (one or more moving body cameras) 12, a travel device 13, a communication device 14, an antenna 15, and a control device 16.

The GNSS receiver 11 is used to acquire a position and an orientation of the vehicle 10. The one or more in-vehicle cameras 12 recognize (detect) a situation around the vehicle 10. The one or more in-vehicle cameras 12 are configured to capture images in front o the vehicle 10. As an example, the one or more in-vehicle cameras 12 include three cameras respectively configured to image the front center, the left front, and the right front of the vehicle 10.

The travel device 13 includes a drive device, a brake device, and a steering device. The drive device includes, for example, at least one of an electric motor and an internal combustion engine for driving the vehicle 10. The brake device includes a brake actuator for braking the vehicle 10. The steering device includes, for example, an electric motor configured to steer wheels.

The communication device 14 communicates with the outside of the vehicle 10. Specifically, the communication device 14 communicates with, for example, the remote operator terminal 20 via the antenna 15.

The control device 16 is a computer configured to control the vehicle 10. The control device 16 includes one or more processors and one or more memory devices. The one or more processors execute various processes related to control of the vehicle 10. The one or more memory devices store various types of information necessary for the processes executed by the one or more processors.

During the remote operation of the vehicle 10, the control device 16 communicates with the remote operator terminal 20 via the communication device 14. The control device 16 transmits vehicle information VCL to the remote operator terminal 20. The vehicle information VCL is information necessary for the remote operation by the remote operator, and includes surrounding situation information of the vehicle 10. The surrounding situation information includes images captured by the in-vehicle cameras 12. The surrounding situation information may include moving object information related to a moving object around the vehicle 10.

Further, the control device 16 receives remote operation information from the remote operator terminal 20. The remote operation information is related to the remote operation by the remote operator. For example, the remote operation information includes the amount of operation by the remote operator. The control device 16 performs vehicle traveling control by controlling the travel device 13 in accordance with the received remote operation information.

1-2. Remote Operator Terminal

The remote operator terminal 20 is a terminal device used when the remote operator remotely operates the vehicle 10. The "remote operation" according to the present disclosure is a concept including "remote driving" in which a remote operator drives a moving body from a remote place, "remote assistance" in which a remote operator assists the driving of a moving body from a remote place, and "remote monitoring" in which a remote operator monitors the driving of a moving body from a remote place. In addition, when the remote operation is performed as the remote driving, the remote operator terminal 20 corresponds to a remote cockpit.

The remote operator terminal 20 includes a communication device 21, an antenna 22, a display device 23, a speaker 24, an operating device 25, and a control device 26.

The communication device 21 performs communication (wireless communication) with the vehicle 10 via the antenna 22. Further, the communication device 21 communicates with the management server 40.

The display device 23 presents various kinds of information to the remote operator by displaying the various kinds of information. The various kinds of information include, as images for the remote operation of the vehicle 10, images in front of the vehicle 10 (vehicle front images) captured by the plurality of in-vehicle cameras 12. In addition, the "vehicle front image" corresponds to an example of the "one or more moving-body camera images" according to the present disclosure.

FIG. 1 shows an example of a screen configuration of the display device 23 viewed from the remote operator. That is, the right side of the drawing sheet corresponds to the right side of the screen when viewed from the remote operator, and the left side of the drawing sheet corresponds to the left side of the screen when viewed from the remote operator. In this example, the display device 23 includes three monitors 231, 232, and 233. The monitors 231, 232, and 233 display the vehicle front images. More specifically, as an example, one or more vehicle front images include a front center image displayed by the monitor 231, a left front image displayed by the monitor 232, and a right front image displayed by the monitor 233. As shown in FIG. 1, the monitor 232 is arranged on the left side of the monitor 231, and the monitor 233 is arranged on the right side of the monitor 231.

Additionally, in the example illustrated in FIG. 1, the display device 23 includes one monitor (monitor 231, 232, or 233) for one image. However, instead of the example illustrated in FIG. 1, the "display device" according to the present disclosure may include one monitor configured to display a plurality of vehicle front images.

The speaker 24 presents sound information to the remote operator by outputting the sound information. The sound information includes, for example, a sound detected by an in-vehicle microphone.

The operating device 25 receives an input from the remote operator. For example, the operating device 25 includes one or more remote operation members operated by the remote operator when remotely operating the vehicle 10. The one or more remote operation members include an accelerator pedal, a brake pedal, and a steering wheel. In addition, the operating device 25 includes switches for other various operations related to the remote operation.

The control device 26 controls the remote operator terminal 20. The control device 26 includes one or more processors 27 (hereinafter, simply referred to as "processor 27") and one or more memory devices 28 (hereinafter, simply referred to as "memory device 28"). The processor 27 executes various processes related to the remote operation including display control of images of the display device 23. The memory device 28 stores various types of information necessary for the processes executed by the processor 27.

The control device 26 communicates with the vehicle 10 via the communication device 21. The control device 26 receives the vehicle information VCL transmitted from the vehicle 10. The control device 26 presents the vehicle information VCL to the remote operator via the display device 23 and the speaker 24. For example, the control device 26 displays the images captured by the in-vehicle camera 12 on the display device 23. Further, the control device 26 outputs the sound detected by the in-vehicle microphone from the speaker 24. The remote operator can recognize the state of the vehicle 10 and the surrounding situation based on the vehicle information VCL.

The remote operator operates the remote operation members of the operating device 25. The operating amounts of the remote operation members are detected by sensors provided in the remote operation members. The control device 26 generates the remote operation information reflecting the operating amounts of the remote operation members by the remote operator. Then, the control device 26 transmits the remote operation information to the vehicle 10 via the communication device 21.

1-3. Intersection Camera

An intersection camera 31 (hereinafter, also simply referred to as "camera 31") is installed at each intersection through which the vehicle 10 passes, and capture an image of an intersection area that is the inside of the intersection and the vicinity thereof. The camera 31 is configured as, for example, the camera device 30 including the camera 31, a communication device 32, and a control device 33. In an example shown in FIGS. 2A and 2B described below, one camera 31 is installed for one intersection.

An image of an intersection area (intersection camera image) captured by each camera 31 is transmitted to the management server 40 via the communication device 32. The management server 40 is configured to be able to communicate with each camera device 30, and manages the intersection camera image transmitted from each camera device 30. The management server 40 is also configured to be able to communicate with the remote operator terminal 20.

The control device 33 includes one or more processors 34 (hereinafter, simply referred to as "processor 34") and one or more memory devices 35 (hereinafter, simply referred to as "memory device 35"). The processor 34 executes various processes related to the intersection camera image. The memory device 35 stores various types of information necessary for the processes executed by the processor 34.

Additionally, communication between the management server 40 and each camera device 30 may be either wired communication or wireless communication. This also applies to communication between the management server 40 and the remote operator terminal 20. Furthermore, when the remote operator terminal 20 communicates with each camera device 30, unlike the example illustrated in FIG. 1, the remote operator terminal 20 may directly communicate with each camera device 30 without going through the management server 40.

2. Control of Image Display on Display Device

According to the present embodiment, in order to facilitate safety confirmation by the remote operator at an intersection while using the image information of the intersection camera 31, the following "determination process PR1" and "highlighting process PR2" are executed.

In the determination process PR1, the intersection camera image installed at an intersection through which the vehicle 10 is planned to pass is analyzed in real time to determine whether or not a moving object is included in the intersection camera image. The highlighting process PR2 is executed when it is determined that the moving object is included in the intersection camera image. Then, in the highlighting process PR2, based on the result of the analysis described above, a highlighting indicating whether the moving object is present in the left or right direction with respect to a traveling direction Dv of the vehicle 10 is applied to the moving-body camera image. The "moving object" is, for example, another vehicle (such as an automobile), a pedestrian, or a bicycle.

2-1. Highlighting Example A

In the highlighting examples A, the "highlighting" described above is a caution mark indicating whether the moving object is present in the left or right direction with respect to the traveling direction Dv of the vehicle 10, and is added to the front center image (moving-body camera image) displayed on the screen (front center screen) of the monitor 231.

Figure 2A:
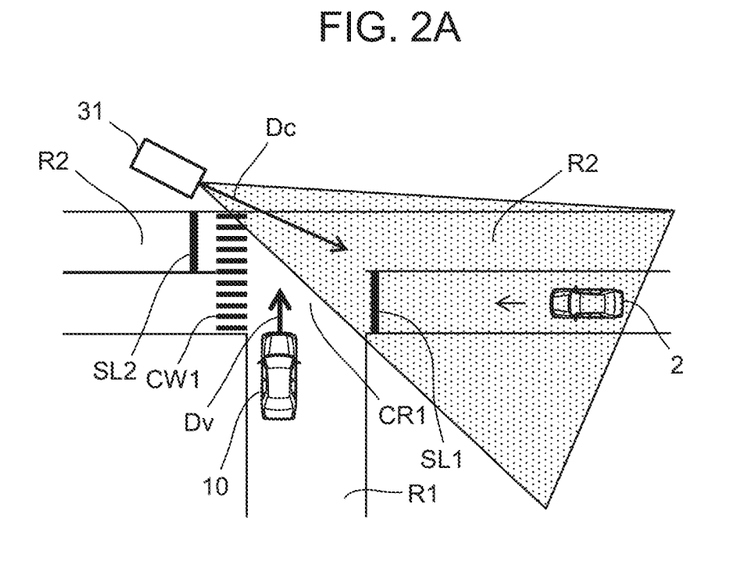
FIG. 2A is a diagram illustrating an example of an intersection.

The highlighting examples A and a highlighting example B described below are described using an intersection CR1 shown in FIG. 2A as an example. In FIG. 2A, a first road R1 on which the vehicle 10 travel is connected to a second road R2 at the intersection CR1. More specifically, FIG. 2A illustrates a traffic situation in an area of the intersection CR1 when the vehicle 10 traveling on the first road R1 along the traveling direction Dv of the vehicle 10 is approaching the intersection CR1. As an example, the camera 31 captures an area of the second road R2 located on the right side of the intersection CR1 with respect to the traveling direction Dv together with the area in the intersection CR1. Another vehicle 2 traveling on the second road R2 is present in the imaging area of this camera 31. In addition, in FIG. 2A, a crosswalk CW1 and stop lines SL1 and SL2 that are provided on the second road R2 are shown.

Figure 2B:
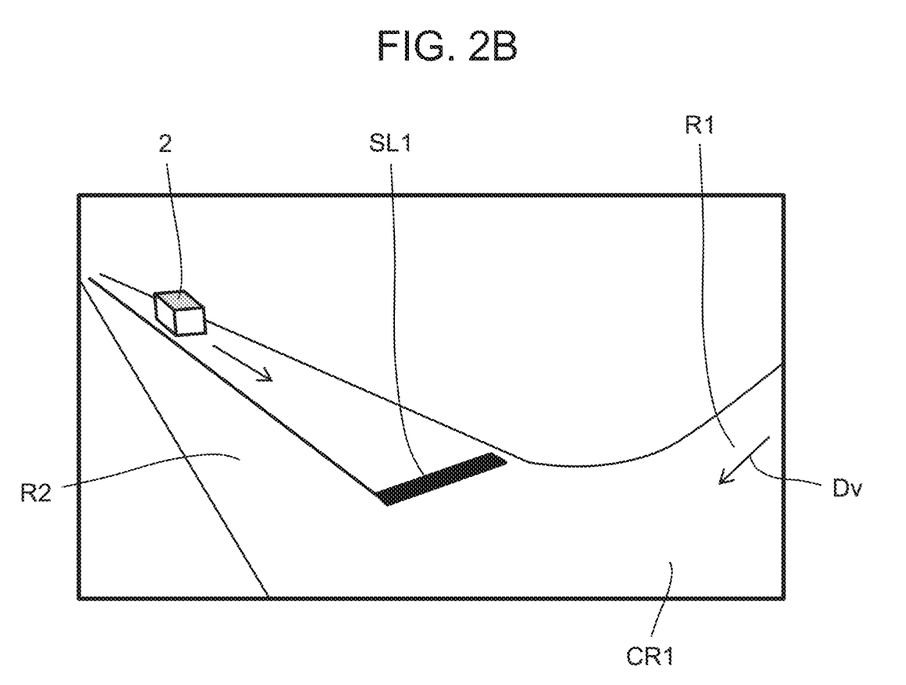
FIG. 2B is a diagram illustrating an example of an intersection camera image.

FIG. 2B shows an intersection camera image captured by the camera 31 shown in FIG. 2A. An intersection camera image indicates a traffic situation in an area of an intersection into which the vehicle 10 enters. The intersection camera image illustrated in FIG. 2B includes another vehicle 2 which is an example of the moving object. According to the determination process PR1 of the present embodiment, it is determined that the another vehicle 2 is included in the intersection camera image by analyzing the intersection camera image of the camera 31. Further, according to the analysis of the intersection camera image by the determination process PR1, when the another vehicle 2 is included in the intersection camera image, the direction in which the another vehicle 2 is present is determined among the left and right directions with respect to the traveling direction Dv of the vehicle 10. In the example of the intersection camera image illustrated in FIG. 2B, the another vehicle 2 is determined to be present on the right side with respect to the traveling direction Dv.

Figures 3A, 3B, 3C:
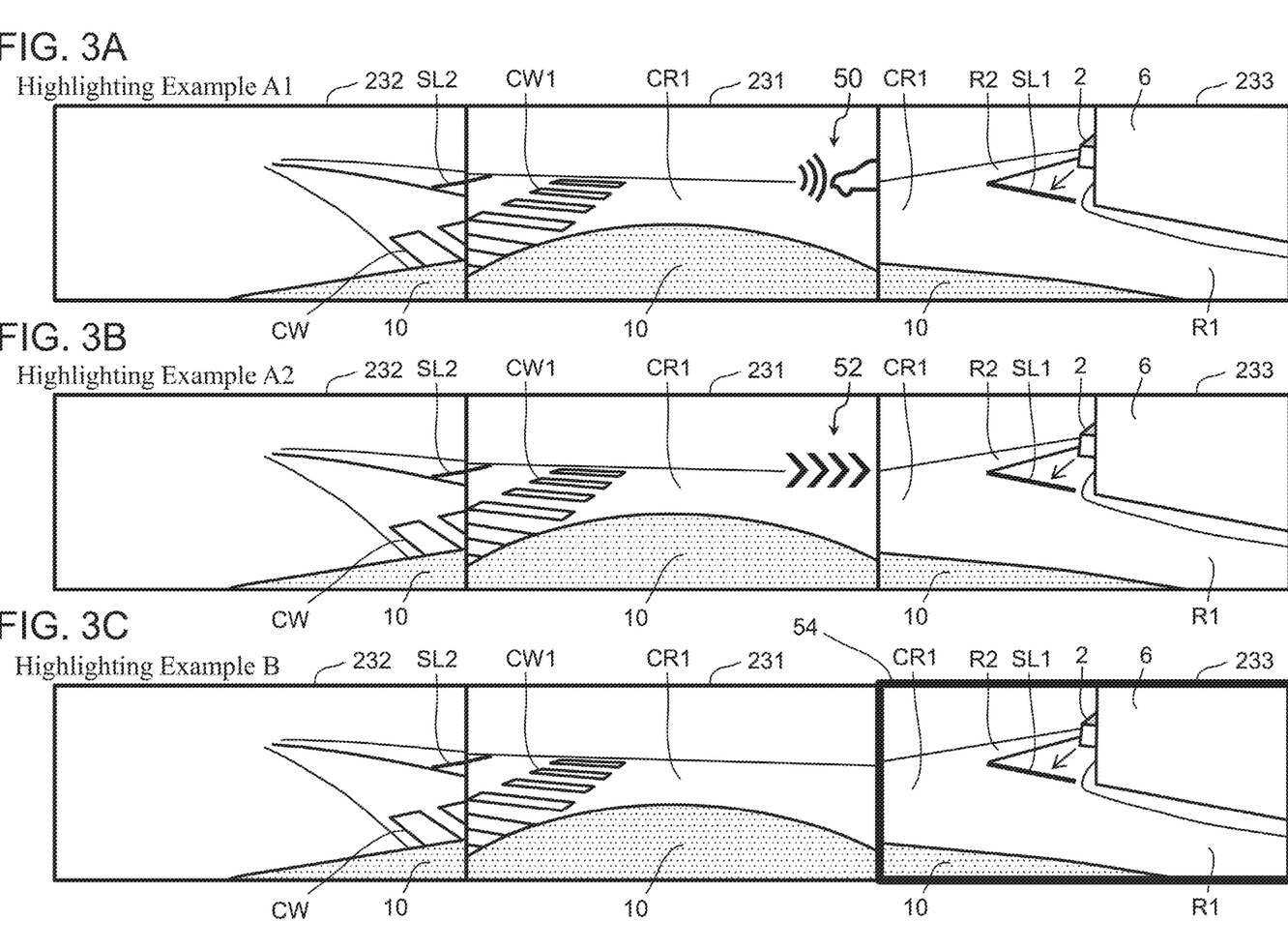
FIG. 3A is a diagram illustrating a highlighting example A1 according to an embodiment.
FIG. 3B is a diagram illustrating a highlighting example A2 according to an embodiment.
FIG. 3C is a diagram illustrating a highlighting example B according to an embodiment.

FIG. 3A is a diagram illustrating a highlighting example A1 which is one of the highlighting examples A. FIG. 3A shows a vehicle front image of each of the monitors 231 to 233 when the vehicle 10 approaches the intersection CR1 shown in FIG. 2A. In the highlighting example A1, a caution mark 50 is added, by the highlighting process PR2 of the present embodiment, to the front center image displayed on the monitor 231. As shown in FIG. 3A, the caution mark 50 indicates whether another vehicle 2 is present in the left or right direction with respect to the traveling direction Dv of the vehicle 10, and is arranged on the right side of the front center image when viewed from the remote operator. As described above, according to the highlighting example A, the information of the moving object (e.g., another vehicle 2) included in the intersection camera image is displayed, for calling attention, on the front center image in which the moving object is not displayed. In addition, a reference numeral 6 denotes a building beside the roads R1 and R2.

More specifically, the caution mark 50 is, for example, a mark (still image) expressed to indicate a state in which the another vehicle 2 that is present near the vehicle 10 is detected. This kind of caution mark 50 is suitably used in a situation in which the type of the moving object can be identified as a result of the analysis by the determination process PR1. In addition, in an example in which the moving object, such as another vehicle 2, is present in the left direction with respect to the traveling direction Dv, a caution mark obtained by flipping the caution mark 50 horizontally is arranged on the left side of the front center image displayed on the monitor 231.

FIG. 3B is a diagram illustrating a highlighting example A2 which is another example of the highlighting examples A. This highlighting example A2 is different from the highlighting example A1 in the caution mark as the highlighting. That is, in the highlighting example A2, animation display is used as a caution mark 52. The caution mark 52 is, for example, an arrow indicating a direction in which the another vehicle 2 is present as illustrated in FIG. 3B. The arrow is displayed by animation so as to flow toward the direction in which the another vehicle 2 is present. In addition, in an example in which the moving object, such as the another vehicle 2 is present in the left direction with respect to the traveling direction Dv, a caution mark obtained by flipping the caution mark 52 horizontally is arranged on the left side of the front center image displayed on the monitor 231.

Additionally, the highlighting examples A (A1 and A2) are applied here to the display device 23 having three screens of the front center screen, the left front screen, and the right front screen. However, application of the highlighting examples A is not limited to the display device 23 having the three screens and can be applied to a display device having at least a front center screen.

2-2. Highlighting Example B

FIG. 3C is a diagram showing a highlighting example B. In the highlighting example B, a highlighting is applied, by the highlighting process PR2 of the present embodiment, to the left front screen or the right front screen corresponding to the direction in which the moving object is present among the left and right directions with respect to the traveling direction Dv of the vehicle 10. To be specific, in an example of the intersection camera image illustrated in FIG. 2B, the highlighting is applied to the right front screen of the monitor 233 corresponding to the right direction in which the another vehicle 2 is present. The highlighting is performed by, for example, surrounding the right front screen with a red frame 54 as shown in FIG. 3C.

Additionally, in an example in which a moving object, such as the another vehicle 2, is present in the left direction with respect to the traveling direction Dv, the left front screen is surrounded by a red frame, contrary to the highlighting example B illustrated in FIG. 3C. Moreover, the highlighting in the highlighting example B may be performed using a frame of any color other than red as long as the color attracts attention of the remote operator. Alternatively, the highlighting may be performed by, for example, flashing or blinking the left front screen or the right front screen, which is the screen on the side where the moving object is present, a designated number of times.

Furthermore, according to the highlighting example B, unlike the highlighting examples A, a highlighting is not added to the front center screen which is the main screen of the remote operation. For this reason, it is possible to perform the highlighting while preventing interference of the highlighting with the vehicle front image.

2-3. Examples of Processing Related to Image Display

In the remote operation system 1 illustrated in FIG. 1, the configuration including the in-vehicle cameras 12, the intersection camera 31, the display device 23, and the processors 27 and 34 corresponds to an example of the "display system" according to the present disclosure. In the display system configured as described above, the determination process PR1 and the highlighting process PR2 described above may be executed by the cooperation of the processor 27 of the remote operator terminal 20 (remote operator terminal side) and the processor 34 of the camera device 30 (infrastructure side) (see FIGS. 4A and 4B). Alternatively, the determination process PR1 and the highlighting process PR2 may be executed by the processor 27 (remote operator terminal-side) (see FIG. 5).

Figures 4A, 4B:
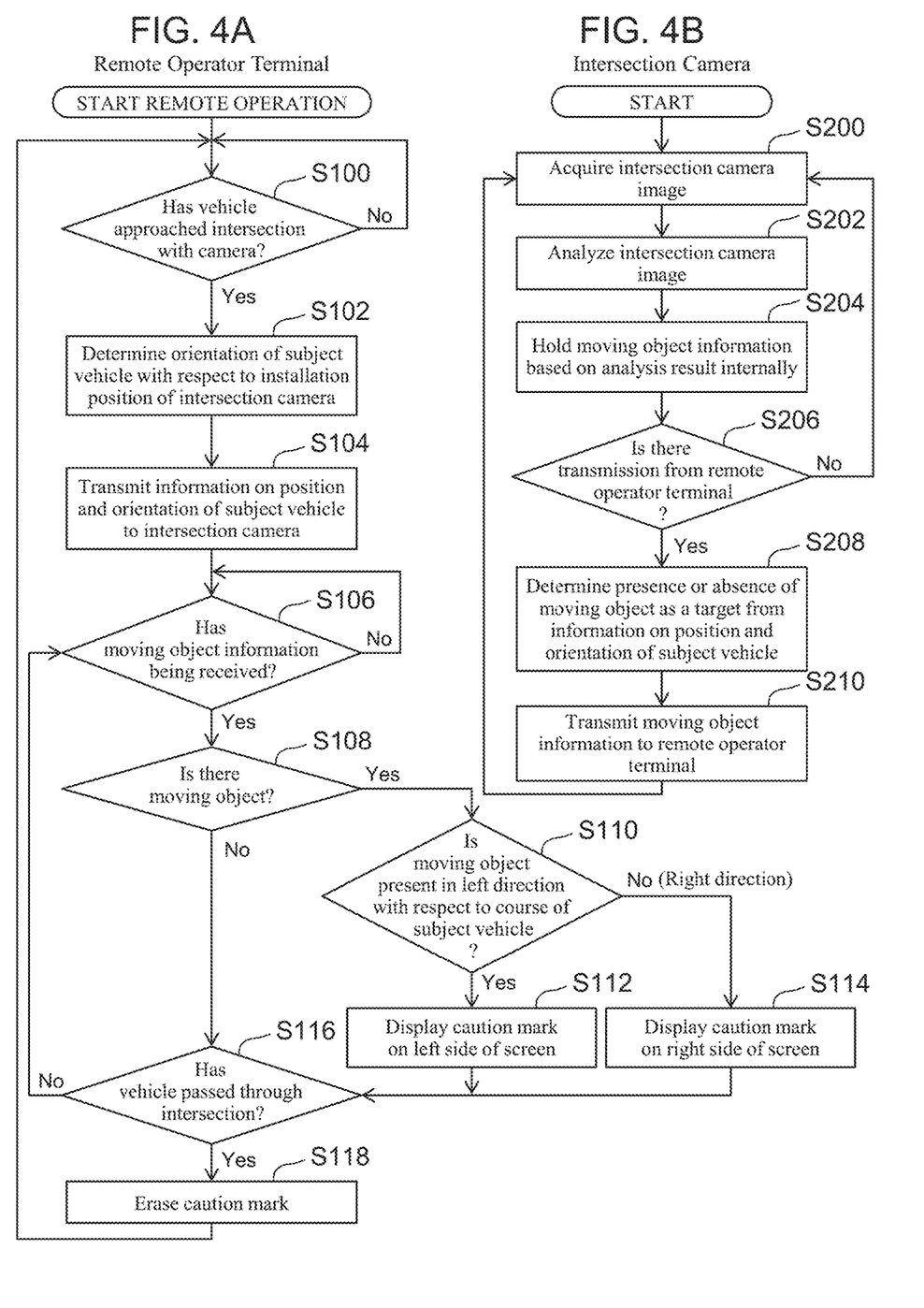
FIG. 4A is one of flowcharts illustrating an example of a flow of processing related to image display according to an embodiment, which is executed by the cooperation of a remote operator terminal side and an infrastructure side.
FIG. 4B is the other of the flowcharts illustrating the example of the flow of processing related to the image display according to the embodiment, which is executed by the cooperation of the remote operator terminal side and the infrastructure side.

2-3-1. Execution Example A by Cooperation of Remote Operator Terminal Side and Infrastructure Side FIGS. 4A and 4B are flowcharts illustrating an example of a flow of processing related to the image display according to the embodiment, which is executed by the cooperation of the remote operator terminal side and the infrastructure side. The processing of the flowchart on the remote operator terminal side is started when the remote operation of the vehicle 10 is started, and is ended when the remote operation is ended. The processing of the flowchart on the infrastructure side is always executed for each camera 31 during the operation of the camera 31 at each intersection.

In step S100 in FIG. 4A, the processor 27 determines whether or not the vehicle 10 has approached an intersection where the intersection camera 31 is installed, based on, for example, the vehicle position information transmitted from the vehicle 10. As a result, when this determination result is Yes, the processing proceeds to step S102.

In step S102, the processor 27 executes a process of determining the orientation of the vehicle 10 (subject vehicle) with respect to the position of the camera 31 installed at the intersection that the vehicle 10 has approached. To be specific, for example, the processor 27 acquires information on an imaging direction Dc of the camera 31 from the camera device 30 including the camera 31. Also, the processor 27 calculates, for example, the traveling direction Dv based on the vehicle position information. Then, based on the information of the imaging direction Dc and the traveling direction Dv, the processor 27 determines the orientation of the vehicle 10 with respect to the installation position of the camera 31 and acquires the orientation as the information of the orientation of the subject vehicle.

Next, in step S104, the processor 27 controls the communication device 21 to transmit to the camera 31 the information on the orientation of the vehicle 10 (subject vehicle) acquired in step S102 together with the position information of the subject vehicle. Then, in step S106, the processor 27 determines whether or not the moving object information of the intersection has been received from the camera 31. This moving object information is information transmitted to the remote operator terminal 20 by the processing of step S210 in FIG. 4B.

In FIG. 4B, in step S200, the processor 34 acquires an intersection camera image from the camera 31. Then, in step S202, the processor 34 analyzes the acquired intersection camera image. This kind of real-time analysis is executed using, for example, the following manner in order to detect a moving object in the intersection camera image.

That is, the analysis is executed by, for example, moving object detection. According to the moving object detection, a moving object can be detected from a difference between temporally consecutive intersection camera images. In addition, the analysis may be executed by image processing using machine learning. By using the machine learning, it is possible to identify and classify moving objects, such as an automobile, a pedestrian, and a bicycle. As a result, for example, like the caution mark 50 described above, the caution mark can be switched in accordance with the type of the moving object.

To be more specific, the analysis of the intersection camera image in step S202 may be executed, for example, while adjusting the size and the moving speed of a moving object as a detection target and the detection area of the moving object as follows. That is, a moving object smaller than a designated size may be excluded from the detection target. As a result, erroneous detection of a moving object can be reduced. In addition, a moving object having a moving speed lower than a designated value may be excluded from the detection target. This also makes it possible to reduce erroneous detection of a moving object.

Further, the adjustment of the detection area of the moving object may be executed as follows, for example. That is, in order to reduce erroneous detection and reduce the calculation load, the area in the intersection camera image used to detect a moving object may be changed (adjusted) for each camera 31 in accordance with at least one of the angle of view and the installation environment of the camera 31. Specifically, in an example of the camera 31 having an angle of view such that the vehicle 10 (subject vehicle) is captured in the intersection camera image, the detection area may be adjusted such that the subject vehicle and the road on which the subject vehicle travels are excluded. Moreover, the detection area may be designated for each camera 31 in order to avoid erroneous detection caused by the presence of an object, such as a tree, that shakes due to wind, and erroneous detection caused by flickering of a fluorescent light. Furthermore, the detection area may be determined based on the information of the traveling direction Dv of the vehicle 10. For example, regarding the intersection camera image of the camera 31 having a wide angle of view, an area unnecessary for the analysis, such as an area behind the vehicle 10, may be excluded from the detection target.

Next, in step S204, the processor 34 (control device 33) internally holds the moving object information acquired based on the result of the analysis in step S202. That is, the moving object information is stored in the memory device 35.

Next, in step S206, the processor 34 determines whether or not the information on the position and orientation of the subject vehicle has been transmitted from the remote operator terminal 20. As a result, when there is no transmission of the information on the position and the orientation of the subject vehicle, the processor 34 repeatedly executes the processing of step S200 and the subsequent steps. On the other hand, when there is transmission of the information, the processing proceeds to step S208.

In step S208, the processor 34 executes a process of determining, from the information on the position and the orientation of the subject vehicle received from the remote operator terminal 20, the presence or absence of a moving object as a detection target in the highlighting according to the present embodiment. To be specific, the processor 34 first determines whether or not a moving object is included in the moving object information held internally in step S204. As a result, when a moving object is included in the moving object information, the processor 34 determines whether or not the moving object is a detection target, based on, for example, the moving direction of the moving object. More specifically, whether the moving object is approaching or moving away from the vehicle 10 may be determined based on the information on the position and the orientation of the subject vehicle transmitted from the remote operator terminal 20. Then, when it is determined that the moving object is approaching the vehicle 10, the processor 34 may set the moving object as a detection target, and when it is determined that the moving object is moving away from the vehicle 10, the processor 34 may exclude the moving object from the detection target. As a result, it is possible to appropriately select the moving object that should be highlighted for attracting attention of the remote operator.

Next, in step S210, the processor 34 controls the communication device 32 to transmit the moving object information determined by the processing of step S208 to the remote operator terminal 20. To be specific, the processor 34 transmits the moving object information determined in response to receiving of the information on the position and the orientation of the subject vehicle from the remote operator terminal 20 (S206; Yes). The moving object information transmitted in this way includes, for example, a flag indicating the presence or absence of a moving object, and the position and the moving direction of the moving object. In addition, when the type of the moving object (for example, another vehicle, a pedestrian, or a bicycle) can be identified by using the machine learning described above, the moving object information which is transmitted may include the type of the moving object.

In FIG. 4A, when the determination result in step S106 is Yes, that is, when the moving object information transmitted by the processing of step S210 is received, the processing proceeds to step S108. In step S108, the processor 27 determines whether or not a moving object is included in the intersection camera image, based on the received moving object information. As a result, when this determination result is Yes, the processing proceeds to step S110, and when the determination result is No, the processing proceeds to step S116.

In step S110, the processor 27 determines whether or not the moving object is present in the left direction with respect to the traveling direction Dv of the vehicle 10 (in other words, with respect to the course of the subject vehicle), based on the received moving object information. As a result, when this determination result is Yes, that is, when the moving object is present in the left direction, the processing proceeds to step S112. In step S112, the processor 27 displays a caution mark (in other words, a caution alert) so as to be arranged on the left side of the front center image displayed on the monitor 231. For example, the caution mark is obtained by horizontally flipping the caution mark 50 or 52. Thereafter, the processing proceeds to step S116.

On the other hand, when the determination result in step S110 is No, that is, when the moving object is present in the right direction, the processing proceeds to step S114. In step S114, the processor 27 displays a caution mark so as to be arranged on the right side of the front center image displayed on the monitor 231. The caution mark is, for example, the caution mark 50 or 52. Thereafter, the processing proceeds to step S116.

Additionally, although the highlighting examples A are applied to the processing of steps S112 and S114 described above, the highlighting example B may be applied.

In step S116, the processor 27 determines whether or not the vehicle 10 has passed through the intersection determined in step S100, based on, for example, the vehicle position information. As a result, the processor 27 repeatedly executes the processing of step S106 and the subsequent steps while the vehicle 10 has not yet passed through the intersection described above. On the other hand, after the vehicle 10 has passed through the intersection, the processor 27 proceeds to step S118 and erases the caution mark displayed by the processing of step S112 or S114.

2-3-2. Execution Example B by Remote Operator Terminal Side

Figure 5:
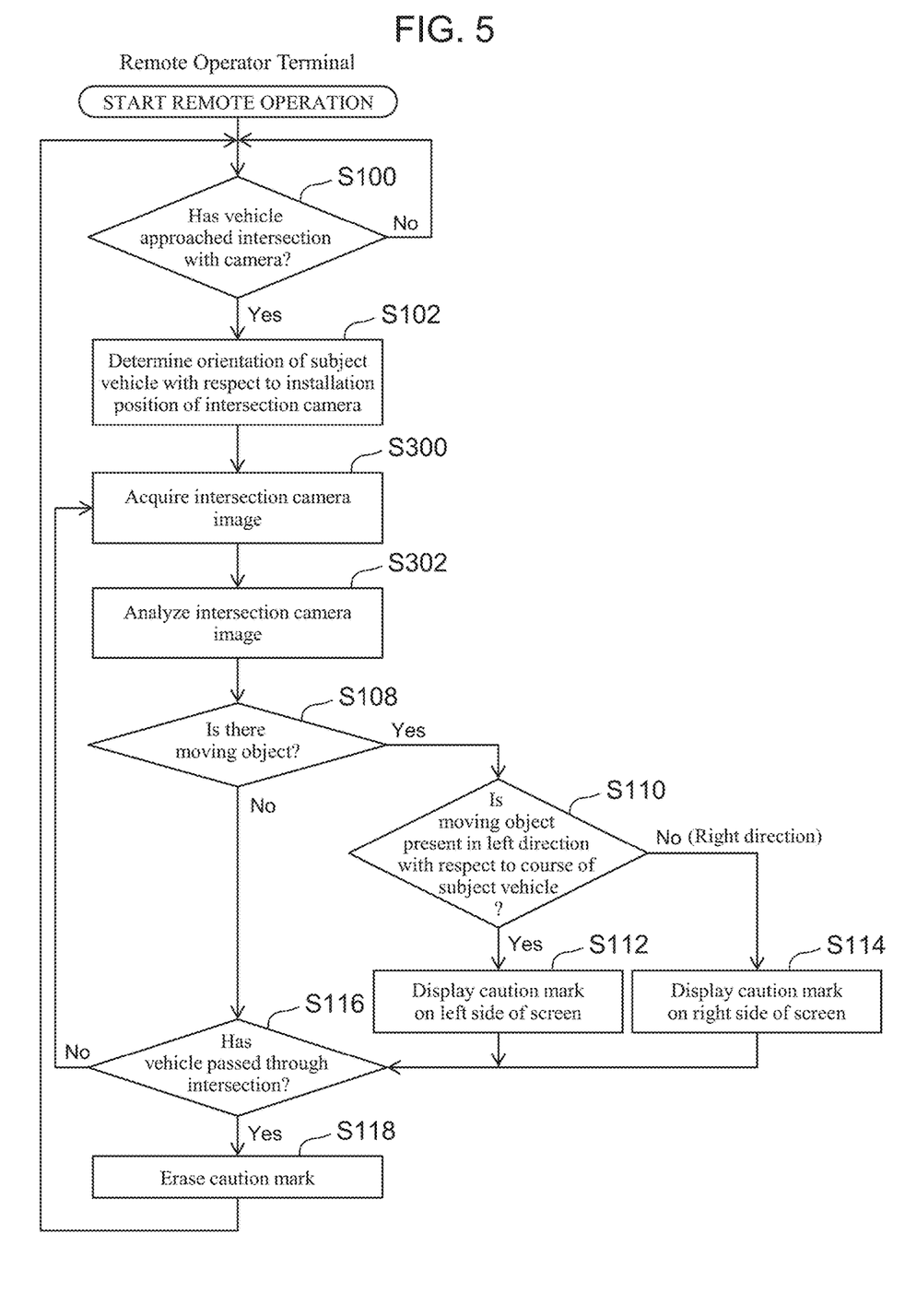
FIG. 5 is a flowchart illustrating another example of the flow of processing related to image display according to an embodiment, which is executed by a remote operator terminal side.

FIG. 5 is a flowchart illustrating an example of a flow of processing related to the image display according to the embodiment, which is executed by the remote operator terminal side. Hereinafter, differences between the processing of the flowchart illustrated in FIG. 4A and the processing of this flowchart will be described.

In FIG. 5, after step S102, the processing proceeds to step S300. In step S300, the processor 27 of the remote operator terminal 20 executes a process of acquiring an intersection camera image from the camera 31 installed at an intersection determined in step S100.

Next, in step S302, the processor 27 executes a process of analyzing the intersection camera image acquired in step S300. The processing of this step S302 is the same as the processing executed in steps S202 and S208 in FIG. 4B. That is, the processor 27 analyzes the intersection camera image received from the camera device 30, and detects the presence or absence of a moving object on the planned course of the subject vehicle using the information on the position and orientation of the subject vehicle. After step S302, the processing proceeds to step S108.

Additionally, in FIG. 5, when the determination result in step S116 is No, the processor 27 repeatedly executes the processing of step S300 and the subsequent steps.

Moreover, the execution example A by the cooperation of the remote operator terminal side and the infrastructure side has the following advantage effect over the execution example B by the remote operator terminal side. That is, according to the execution example A, only the moving object information (see step S210), such as the flag indicating the presence or absence of a moving object, is transmitted from the infrastructure side to the remote operator terminal side, and, as a result, there is no need to transmit the intersection camera image to the remote operator terminal 20. Therefore, according to the execution example A, it is possible to reduce the communication amount as compared with the execution example B. In addition, since it is not necessary to transmit the intersection camera image, the influence of communication delay can also be reduced.

Additionally, in the flowcharts shown in FIGS. 4A and 4B, the processes of steps S202, S208, and S108 correspond to an example of the "determination process PR1" according to the present disclosure, and the processes of steps S110 to S114 correspond to an example of the "highlighting process PR2" according to the present disclosure. On the other hand, in the flowchart shown in FIG. 5, the processes of steps S302 and S108 correspond to an example of the "determination process PR1" according to the present disclosure, and the processes of steps S110 to S114 correspond to an example of the "highlighting process PR2" according to the present disclosure.

As described above, according to the present embodiment, the determination process PR1 is executed to determine whether or not a moving object is included in an intersection camera image by analyzing the intersection camera image. As a result, when the moving object is included in the intersection camera image, the highlighting process PR2 is executed to apply, to the vehicle front image, a highlighting indicating whether the moving object is present in the left or right direction with respect to the traveling direction Dv of the vehicle 10. That is, the moving object information based on the analysis result of the intersection camera image is displayed as a highlighting on the vehicle front image. Therefore, without displaying the intersection camera image itself on the display device 23, it is possible to make the remote operator recognize that there is a moving object which may be an obstacle to the traveling of the vehicle 10 in the right or left direction of an intersection in front of the vehicle 10, based on the moving object information from the intersection camera image. As described above, according to the present embodiment, it is possible to facilitate the safety confirmation by the remote operator at an intersection while using the image information of the intersection camera 31.

Furthermore, in the remote operator terminal 20, the intersection camera image itself acquired by the intersection camera 31 is not displayed. By narrowing down the display targets on the display device 23 in this way, the remote operator only needs to confirm the main screens of the remote operation, that is, the front center screen, the left front screen, and the right front screen that display the vehicle front images. That is, excessive provision of information to the remote operator can be reduced. Thus, in an example of the remote driving, the remote operator can more easily concentrate on the remote driving of the vehicle 10. Further, since the attention is called by the highlighting according to the present embodiment, the number of confirmation points of the remote operator is reduced. This leads to less fatigue for the remote operator.

3. Examples of Displaying Intersection Camera Image for Reference

In the embodiment described above, the intersection camera image itself is not displayed on the display device 23. However, the intersection camera image may be displayed on the display device 23 as reference information. For example, the intersection camera image may be displayed on a monitor arranged above the monitors 231-233 shown in FIG. 1. In addition, display/non-display of this kind of intersection camera image may be selectable by the remote operator.

Figure 6A:
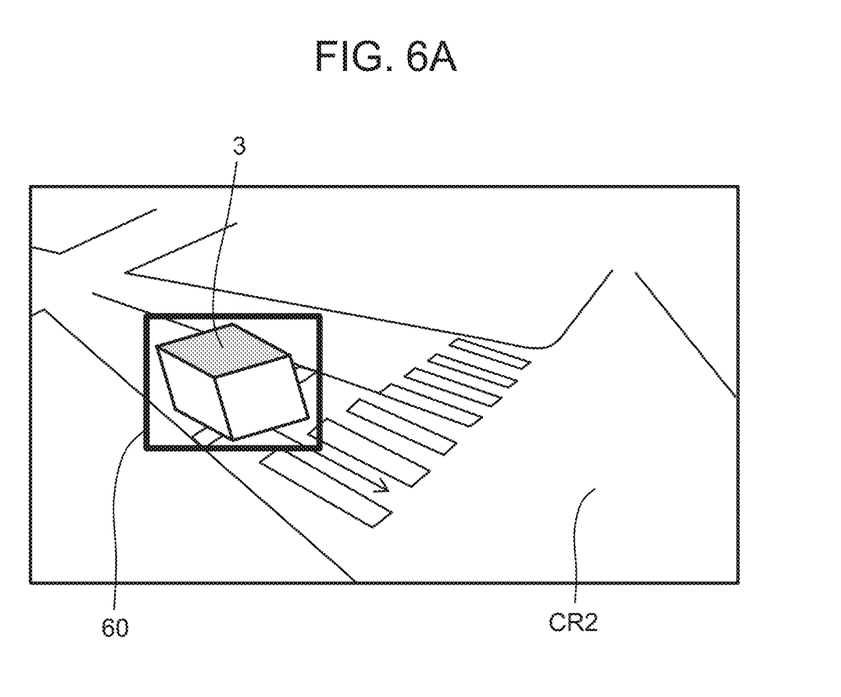
FIG. 6A is a diagram illustrating an example of the intersection camera image displayed as reference information.
Figure 6B:
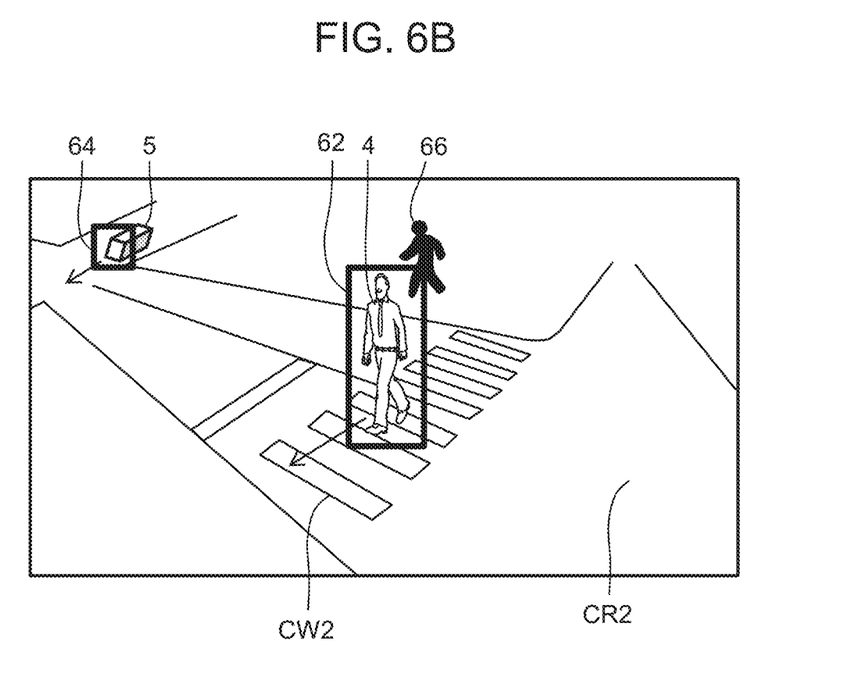
FIG. 6B is a diagram illustrating another example of the intersection camera image displayed as reference information.

FIGS. 6A and 6B are diagrams illustrating examples of the intersection camera image displayed as reference information. In an intersection camera image shown in FIG. 6A, another vehicle 3 approaching an intersection CR2 is detected as a moving object. Further, in an intersection camera image shown in FIG. 6B, a pedestrian 4 crossing a crosswalk CW2 and another vehicle 5 traveling on a road away from the intersection CR2 are detected as moving objects. In order to display one or more moving objects detected as described above in an easy-to-understand manner, quadrilateral frames 60, 62, and 64 respectively surrounding the another vehicle 3, the pedestrian 4, and the another vehicle 5 may be additionally displayed on the corresponding intersection camera image. Furthermore, where the type of each moving object can be determined using the machine learning described above, a mark indicating the type of moving object, such as a pedestrian mark 66 in the example of the pedestrian 4, may be added.

The invention claimed is:

1. A display system, comprising:
three moving body cameras respectively configured to image a front center, a left front, and a right front of a moving body;
one or more intersection cameras installed at an intersection through which the moving body passes, nd configured to image a traffic situation in an area of the intersection, and included in one or more camera devices;

a display device including a front center screen, a left front screen, and a right front screen respectively configured to display, as images for remote operation of the moving body, moving-body camera images of the front center, the left front, and the right front of the moving body captured by the three moving body cameras;

one or more first processors included in a remote operator terminal; and one or more second processors included in the one or more camera devices, wherein the one or more first processors and the one or more second processors are configured to cooperate to execute a determination process, the determination process includes:

the one or more second processors analyze an intersection camera image of the one or more intersection cameras;

the one or more second processors determine a moving object information including a flag indicating a presence or absence of a moving object in the intersection camera image, and a position and moving direction of the moving object, based on a result of the analysis of the intersection camera image and information on a position and orientation of the moving body from the remote operator terminal;

the one or more second processors transmit the determined moving object information to the remote operator terminal; and the one or more first processors determine whether or not the moving object is included in the intersection camera image based on the determined moving object information from the one or more second processors, the one or more first processors are configured to execute a highlighting process of applying a highlighting to the moving-body camera images when the moving object is included in the intersection camera image, the highlighting indicating whether the moving object is present in a left or right direction with respect to a traveling direction of the moving body, and in the highlighting process, the one or more first processors apply the highlighting to the left front screen or the right front screen corresponding to a direction in which the moving object is present among the left and right directions with respect to the traveling direction.

2. The display system according to claim 1, wherein
in the determination process, the one or more second processors set the moving object as a detection target when the moving object is approaching the moving body, and exclude the moving object from the detection target when the moving object is moving away from the moving body.

3. The display system according to claim 1, wherein
in the determination process, the one or more second processors change, in accordance with at least one of an angle of view and an installation environment of the one or more intersection cameras, an area in an intersection camera image that is a target of the determination as to whether or not the moving object is included in the intersection camera image.

* * * * *